No. 785,089. PATENTED MAR. 21, 1905.
G. D. C. CODDINGTON.
MACHINE FOR COATING SEALING RINGS WITH WAX.
APPLICATION FILED FEB. 10, 1904.
2 SHEETS—SHEET 1.
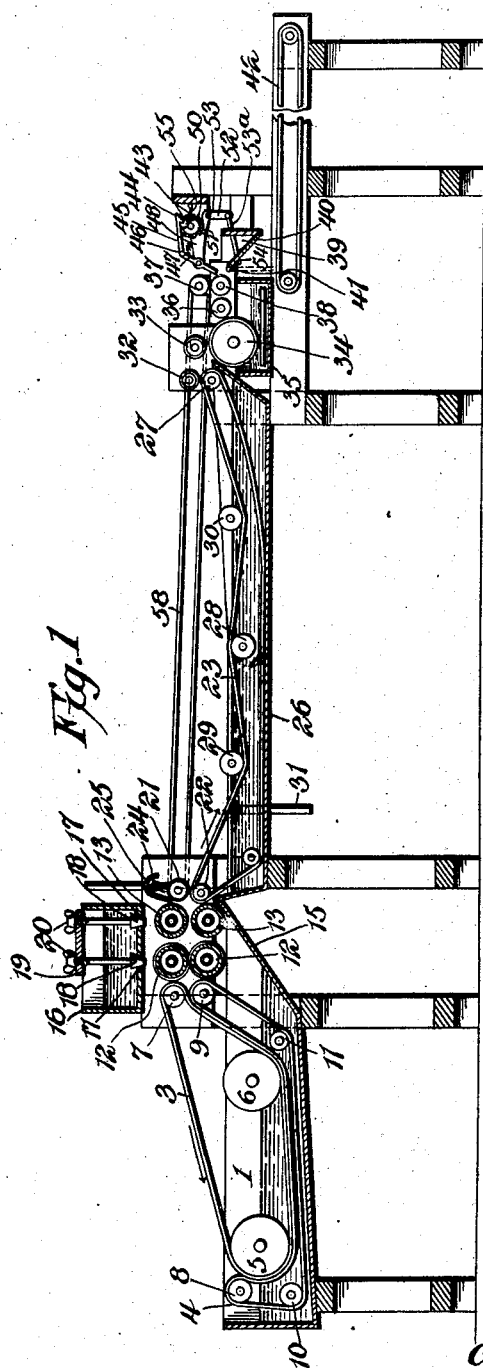
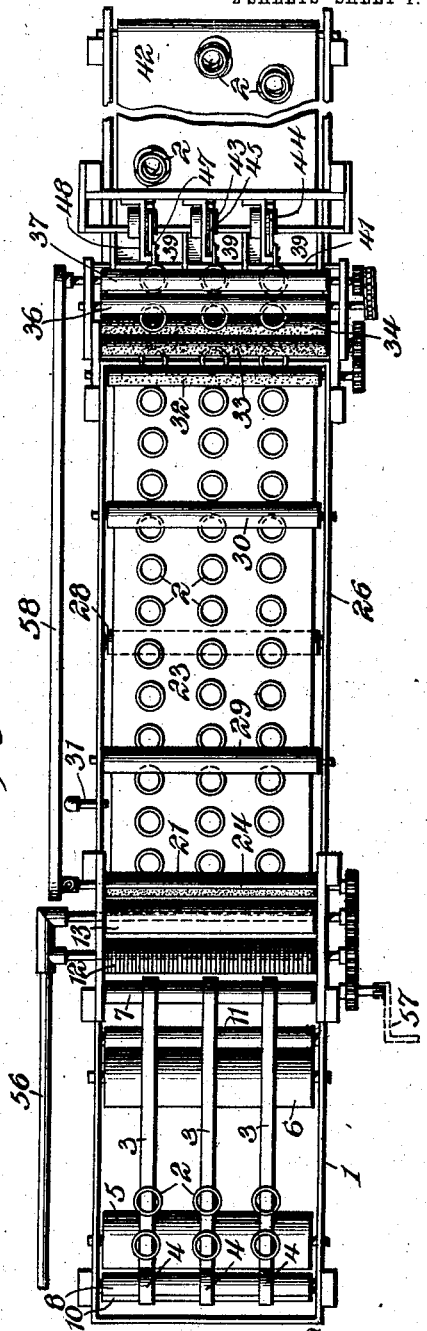
George D. C. Coddington, Inventor,
Witnesses No. 785,089. PATENTED MAR. 21, 1905.
G. D. C. CODDINGTON.
MACHINE FOR COATING SEALING RINGS WITH WAX.
APPLICATION FILED FEB. 10, 1904.
2 SHEETS—SHEET 2.
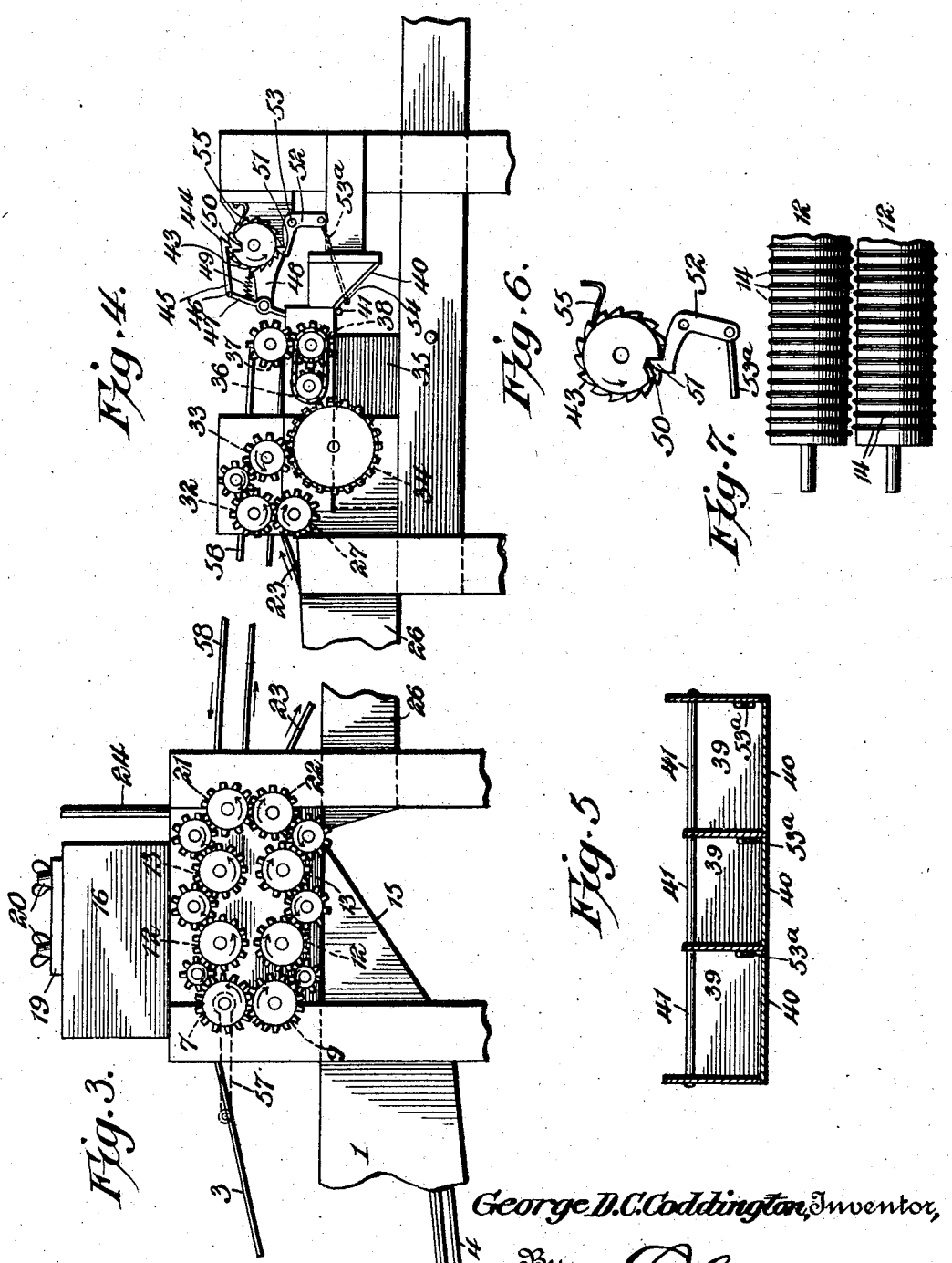

No. 785,089. Patented March 21, 1905.

UNITED STATES PATENT OFFICE.

GEORGE DAVID CULLUM CODDINGTON, OF HENO, OHIO, ASSIGNOR TO BALL BROTHERS GLASS MANUFACTURING COMPANY, OF MUNCIE, INDIANA.

MACHINE FOR COATING SEALING-RINGS WITH WAX.

SPECIFICATION forming part of Letters Patent No. 785,089, dated March 21, 1905.

Application filed February 10, 1904. Serial No. 192,985.

*To all whom it may concern:*

Be it known that I, GEORGE DAVID CULLUM CODDINGTON, a citizen of the United States, residing at Heno, in the county of Butler and State of Ohio, have invented a new and useful Machine for Coating Sealing-Rings with Wax, of which the following is a specification.

The invention relates to machines for coating sealing-rings with wax.

The object of the present invention is to provide a machine of simple and comparatively inexpensive construction for the manufacture of the sealing or packing rings set forth in Patent No. 748,586, granted to me January 5, 1904, and to provide a machine of this character adapted to apply sealing material in a heated condition to previously stamped or cut rings of cardboard and capable of cooling the sealing material after the same has been applied to the rings and of applying a coating of non-adhesive material to the same to prevent the packing or sealing rings from adhering to each other when put up in packages.

Furthermore, it is the object of the invention to provide a machine adapted to rapidly produce packing or sealing rings of a size and shape to fit over the neck of an ordinary fruit jar or can and capable of having its coating of sealing material melted by the heat incident to canning the contents of such jars or cans, whereby when the tops or covers are applied to the same the wax coating will conform to the configuration of the jars or cans and the tops and provide a perfect seal irrespective of any irregularities in the construction of the receptacles and covers.

A further object of the invention is to provide a machine adapted to feed the coated rings through a supply of sealing material and capable of spreading the same uniformly over the surfaces of the rings and of subjecting the coated rings to a bath, whereby the temperature of the rings is lowered to set the sealing material.

Another object of the invention is to provide a machine for coating packing or sealing rings adapted to deliver the completed rings in bunches of a predetermined size, so that they may be conveniently and rapidly put up in packages.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a longitudinal sectional view of a machine for coating packing or sealing rings constructed in accordance with this invention. Fig. 2 is a plan view of the same. Fig. 3 is an enlarged side elevation illustrating the arrangement of the front gearing. Fig. 4 is a similar view illustrating the arrangement of the rear gearing. Fig. 5 is a detail view illustrating the arrangement of the independent hoppers. Fig. 6 is a detail view illustrating the construction of the hopper-operating device. Fig. 7 is a detail view illustrating the construction of the corrugated rolls.

Like numerals of reference designate corresponding parts in all the figures of the drawings.

1 designates a trough or tank designed to contain sealing material similar to that described in the patent before referred to, and this wax composition, which is designed to be fusible at about 150° Fahrenheit, is adapted to be melted by the heat incident to canning goods, and when it is applied to a jar or other receptacle the heated contents thereof will cause it to melt and conform to the configuration of the bottom and top of the jar, whereby a perfect seal is produced. The sealing composition of the trough may be maintained in a fluid condition by any suitable heating means, and the rings 2 to be coated are carried through such material by a front conveyer consisting of upper and lower endless belts 3 and 4, having contiguous flights or portions adapted to clamp the rings and positively carry the same through the contents of the trough. The belts are of a width less than the diameter of the rings to cause the latter to project at each side of the belts to expose the projecting portions of the rings to the wax composition, whereby the rings will receive a sufficient amount of the wax composition. A plurality of conveyers may be employed, as indicated in Fig. 2 of the drawings, and the upper endless belts are arranged on a pair of lower rolls 5 and 6 and an upper roll 7. The rolls 5 and 6, which are preferably of the same diameter, are journaled between the sides of the trough and extend into the sealing composition, being partially submerged in the same. The upper roll 7, which is smaller than the rolls 5 and 6, is located above and in rear of the same, each upper belt being provided with a long inclined downwardly-moving upper flight on which the rings are placed. The lower belt is arranged on upper rolls 8 and 9 and lower rolls 10 and 11. The upper roll 8, which is located at the front of the machine, is arranged contiguous to the roll 5, and the upper flight of the lower belt passes downward from the upper roll 8, under the rolls 5 and 6, and upward to the rear upper roll 9, which is located immediately beneath the roll 7. By this arrangement the upper flight of the lower belt is contiguous to and is adapted to fit against the lower flight of the upper belt, and these contiguous flights extend upward from the roll 6, which carries the rings from the trough to heated rolls 12 and 13. As the rings are placed on the downwardly-traveling inclined flights of the upper belts they are carried between the upper and lower belts and are firmly held by the same while the rings are passing through the trough. The belts may consist of sprocket-chains or be provided with apertures or be constructed in any desired manner, and the rings, which project laterally beyond the belts, as shown, obtain a sufficient quantity of sealing compound to coat them thoroughly. The trough 1, which is supported by suitable legs, as shown, may be mounted in any other desired manner, as will be readily understood.

The hot or heated rolls 12 and 13 are arranged in pairs, as clearly shown in Fig. 1, and while they are preferably heated by steam any other heating means may be provided. The rolls are journaled in suitable bearings, the front rolls 12 being corrugated and adapted to receive and draw the rings from the belts without scraping or squeezing the sealing material from the rings. The grooved or corrugated front rolls are provided with annular ribs 14, arranged at regular intervals, the ribs of one roll projecting into the spaces or grooves between the ribs 14 of the other roll, and the body portions of the rolls being slightly spaced from each other, as shown, to avoid the said squeezing action. The rear heated rolls 13 are smooth and are adapted to spread the wax uniformly over the rings. The front trough is provided at its rear end with an extension 15, which has an inclined end wall and which extends beneath the rolls 12 and 13 to catch any composition dropping from the rolls.

The wax composition is supplied to the heated rolls by means of a superimposed tank 16, having discharge-apertures 17 and provided with valves 18. The discharge-apertures are located above the upper rolls 12 and 13 and may be of any desired number, and the valves are provided with threaded stems piercing a horizontal support 19 and provided with adjusting-nuts 20. The apertures 17 are designed to be arranged in position for coating the rolls at the points where the rings pass between them, and the composition of the superimposed tank or receptacle may be maintained in a liquid condition by any suitable heating means. After the coated rings leave the smooth heated rolls they pass under a roll 21, being received between the same and a roll 22 of an intermediate conveyer 23. The roll 21 is provided with a yieldable covering of cloth or any other suitable material and is arranged beneath a water-supply pipe 24. The water-supply pipe, which is arranged beneath a shield 25, is adapted to maintain the roll 21 in a saturated condition for cooling the rings, and the intermediate conveyer is provided with a wet belt, which passes over the roll 22. By this construction the rings are subjected to a bath of cold water and the sealing material is thereby set and hardened. The shield, which is disposed transversely of the machine, extends downward between the roll 21 and the adjacent heated roll to prevent the latter from being materially affected by the water and to prevent the heat from materially affecting the water.

The intermediate conveyer 23, which consists of the wet belt and a series of guide-rolls, is adapted to carry the rings beneath the surface of the contents of the intermediate tank or trough 26. The intermediate tank or trough 26 is arranged at the center of the machine and extends rearward from a point beneath the rolls 21 and 22. The upper flight of the wet belt extends from the roll 21 to a rear roll 27 and its intermediate portion passes over a centrally-arranged roll 28 and under rolls 29 and 30, whereby the rings are successively submerged in the water. Any number of these guide-rolls may be employed and a tank or trough of any desired length may be provided. The water from the supply-pipe 24 supplies the tank with water, and a suitable overflow-pipe 31 is provided, which prevents the water within the intermediate trough from flowing over the walls of the trough.

A drying-roll 32 is arranged above the rear guide-roll 27 of the intermediate conveyer and is adapted to assist in removing the water from the rings, the drying-roll being provided with a covering of absorbent material.

In order to prevent the rings from sticking together, they are coated with a non-adhesive material, which when dry is in the form of a powder. This material is supplied to the rings by means of upper and lower rolls 33 and 34, the lower roll being of greater diameter than the upper roll and extending into a tank or trough 35, containing a solution or compound composed of finely-powdered earthy material, such as clay, ground asbestos, talc, or the like. These rolls 33 and 34 are covered with fabric, such as blanket, which is saturated with the solution and which applies the same to the rings as they pass between them. The lower roll carries the solution upward to the rings and also supplies the upper roll with the same, whereby the rings are sufficiently coated to prevent them from adhering to each other.

After the rings leave the rolls 33 and 34 they pass over a guide-roll 36 and between rolls 37 and 38 and fall into hoppers 39. The hoppers are arranged in a transverse series and provided with hinged bottoms or doors 40, arranged at an inclination, as shown, and hinged at their upper edges at 41. The doors or bottoms 40 are located above a rear conveyer 42 and are adapted to discharge the rings upon the same in bunches, whereby the rings may be rapidly and conveniently put up in packages. Each hopper is provided with a counting device having a ratchet-wheel 43, provided with teeth corresponding to the number of rings in the bunches discharged upon the rear conveyer and engaged by an actuating-pawl 44. The actuating-pawl 44 is arranged at the rear end of a rod 45, which is pivoted at its front end 46 to the upper end of a lever 47. The lever 47 is fulcrumed between its ends on a bracket 48, and its lower arm is arranged opposite the space between the rolls 37 and 38 and in position to be engaged by the rings passing between the same, whereby it will be oscillated by each of the rings to advance the ratchet-wheel step by step, the ratchet-wheel being rotated the distance of one tooth as each ring drops into the hopper. The actuating-pawl is returned to its initial position by means of a coiled spring 49, connected with the lever and with the bracket; but any other desired arrangement may be employed for effecting this result. The ratchet-wheel is also provided with a cam-shaped notch 50, which is arranged to receive a tooth 51 of a lever 52, that is pivoted between its end by a pin 53 or other suitable means. The tooth 51 is arranged at one end of the lever, and the other end of the same is connected to a rod or bar $53^a$, which is connected with a door or closure. The toothed lever is located in rear of the hopper, and the rod or bar $53^a$ extends forwardly therefrom through an opening of the rear wall of the hopper and is pivoted at its front end 54 to the door or closure, which is arranged in advance of the rear wall of the hopper. When the ratchet-wheel makes a complete revolution, the tooth of the lever enters the cam-notch and permits the door or bottom of the hopper to open, whereby a bunch of rings is deposited upon the rear carrier. The cam-notch is provided with an inclined or angularly-disposed wall, whereby it is adapted to force the toothed end of the lever downward or outward for closing the door or bottom of the hopper. The ratchet-wheel is held against retrograde rotation by a check-pawl 55, arranged as shown in Fig. 6.

Steam is preferably supplied to the heated rolls 12 and 13 by means of a steam-pipe 56, having branches extending into said rolls, as clearly indicated in Fig. 2 of the drawings.

The machine may be operated by any suitable means and from any source of power, a crank 57 being indicated in dotted lines as applied to one end of the roll 7. Motion is communicated from roll 7 to the adjacent rolls by means of suitable gears, as illustrated in Fig. 3 of the drawings. A belt 58 and pulleys are employed for communicating motion from the front rolls to the rear rolls, and suitable gears are provided for communicating motion from one rear roll to another, as clearly illustrated in Fig. 4 of the drawings; but any other desired arrangement of gears may be provided, as will be readily understood. Also any other suitable means may be employed for supplying sealing material to the rings.

Having thus fully described my invention, what I claim as new, and desire to secure by Letters Patent, is—

1. A machine of the class described, comprising carrying mechanism for conveying the rings to be coated, means for applying sealing material in a heated condition to the rings, means for setting and hardening the sealing material, and means actuated directly by the rings for collecting and discharging the same in bunches, substantially as described.

2. A machine of the class described, comprising carrying mechanism for carrying the rings to be coated, means for supplying sealing material in a heated condition to the rings, heated grooved rolls for spreading the material uniformly over the rings, and means for setting and hardening the sealing material, substantially as described.

3. A machine of the class described, comprising carrying mechanism for conveying the rings to be coated, means for supplying sealing material in a heated condition to the rings, heated rolls arranged one above the other for spreading the material uniformly over the rings, and means for setting and hardening the sealing material, substantially as described.

4. A machine of the class described, comprising carrying mechanism for conveying the rings to be coated, means for supplying the sealing material in a heated condition to the rings, heated rolls for spreading the material uniformly over the rings, and means for setting and hardening the material, the said rolls being interposed between the means for supplying the sealing material and the means for setting and hardening the same and serving to transfer the rings from the former to the latter, substantially as described.

5. A machine of the class described, comprising carrying mechanism, means for applying sealing material in a heated condition to the rings, grooved and smooth heated rolls arranged in pairs for spreading the sealing material over the rings, substantially as described.

6. A machine of the class described, comprising a receptacle for sealing material, and a conveyer for carrying the rings to be coated through the material, said conveyer being of a width less than the diameter of the rings to cause the latter to project from opposite sides of the conveyer, whereby the projecting portions are exposed to the sealing material within the receptacle, substantially as described.

7. A machine of the class described, comprising a conveyer consisting of a pair of belts having contiguous flights arranged to clamp the rings to be coated, said belts being of a width less than the diameter of the rings to cause the latter to project from opposite sides of the belts, and means for applying sealing material to the rings, substantially as described.

8. A machine of the class described, comprising a receptacle provided with sealing material, and a conveyer comprising a pair of endless belts having contiguous flights arranged to clamp the rings and located within the said receptacle for carrying the said rings through the sealing material, said belts being of a width less than the diameter of the rings to cause the latter to project from opposite sides of the belts, substantially as described.

9. A machine of the class described, comprising a receptacle, a plurality of conveyers, each consisting of a pair of endless belts having contiguous flights arranged to clamp the rings and located within the receptacle to carry the said rings through the sealing material, said belts being of a width less than the diameter of the rings to cause the latter to project from opposite sides of the belts, and heated rolls arranged to receive the rings from the conveyers for spreading the sealing material uniformly over the surfaces of the rings, substantially as described.

10. A machine of the class described, comprising a receptacle for sealing material, a plurality of conveyers each consisting of belts having contiguous flights for engaging the rings to carry the same through the sealing material, heated rolls located over the receptacle and arranged to receive the rings from the conveyer, and a superimposed receptacle for discharging sealing material upon the rolls, substantially as described.

11. A machine of the class described, comprising a receptacle for sealing material, carrying mechanism for conveying the rings to be coated through the sealing material, heated rolls arranged to receive the rings from the carrying mechanism, and a superimposed receptacle for discharging sealing material upon the heated rolls, substantially as described.

12. A machine of the class described, comprising means for applying sealing material in a heated condition to the rings, a trough for containing a liquid for cooling the rings to set and harden the material, an endless conveyer having a flight arranged to submerge the rings in the said liquid, and rolls interposed between the means for applying sealing material, and the endless conveyers for transferring the rings from the former to the latter, substantially as described.

13. A machine of the class described, comprising means for applying sealing material in a heated condition to the rings, a trough for containing a liquid for cooling the rings to set and harden the material, and an endless conveyer composed of a belt, and transverse rolls arranged at different elevations and receiving the belt and submerging the same at different points, substantially as described.

14. A machine of the class described, comprising means for applying sealing material to the rings, heated rolls for spreading the material uniformly over the surfaces of the rings, a discharge-pipe located in rear of the rolls for cooling the rings to set and harden the sealing material, and a shield interposed between the discharge-pipe and the said rolls, substantially as described.

15. A machine of the class described, comprising means for applying sealing material in a heated condition to the rings, a receptacle for containing a liquid for cooling the rings, an endless conveyer operating in the receptacle, and a plurality of rolls located at different points and arranged above and below one of the flights of the conveyer for forming a plurality of submerged portions, substantially as described.

16. A machine of the class described, comprising means for applying sealing material in a heated condition to the rings, a tank for holding a liquid for cooling the rings, a conveyer for carrying the rings through the said liquid, a drying device for removing water from the rings after they leave the conveyer, and means for coating the rings with a liquid solution of powered material after they leave the drying device, substantially as described.

17. A machine of the class described, comprising means for coating rings with sealing material, a plurality of hoppers arranged to receive the rings, a conveyer operating beneath the hoppers, and means for discharging the rings from the hoppers in bunches, substantially as described.

18. A machine of the class described, comprising means for applying sealing material to the rings, a plurality of hoppers arranged to receive the rings and having movable doors or closures, and means operable by the rings for discharging the same from the hoppers in bunches of a predetermined size, substantially as described.

19. A machine of the class described, comprising means for applying sealing material to the rings, a plurality of hoppers arranged to receive the rings and having movable doors or closures, a conveyer located beneath the hoppers and means operable by the rings for opening the doors or closures to discharge the rings in bunches upon the conveyer substantially as described.

20. A machine of the class described, comprising carrying mechanism for conveying the rings to be coated, a hopper located adjacent to the carrying mechanism and having a movable closure, ratchet mechanism connected with the closure for opening and closing the same, and means actuated by the rings for operating the ratchet mechanism, substantially as described.

21. A machine of the class described, comprising carrying mechanism for conveying the rings to be coated, an operating-lever arranged in the path of the rings, ratchet mechanism actuated by the operating-lever, and dumping mechanism controlled by the ratchet mechanism, substantially as described.

22. A machine of the class described, comprising carrying mechanism for conveying the rings to be coated, a ratchet-wheel having a cam, dumping mechanism, a movable member connected with the dumping mechanism and arranged in the path of the cam, and means operable by the rings for actuating the ratchet-wheel, substantially as described.

23. A machine of the class described, comprising means for coating rings with sealing material, a hopper arranged to receive the rings, means operable by the rings for discharging the same from the hopper in bunches, and a conveyer arranged to receive the rings as they are discharged from the hopper, substantially as described.

24. A machine of the class described, comprising a receptacle for sealing material, a conveyer arranged therein for carrying the rings through the sealing material, a trough for containing a liquid for cooling the rings to set and harden the sealing material, a conveyer arranged in the trough, and spreading-rolls interposed between and arranged in line with the conveyers for transferring the rings from one conveyer to another, substantially as described.

25. A machine of the class described, comprising a réceptacle for sealing material, a conveyer for carrying rings to be coated through the sealing material, a trough for containing a liquid for cooling the rings to set and harden the sealing material, a conveyer arranged within the trough, heated rolls interposed between the conveyers for spreading the sealing material over the rings, said rolls serving to transfer the rings from one conveyer to another, and means for supplying the heated rolls with sealing material, substantially as described.

In testimony that I claim the foregoing as my own I have hereto affixed my signature in the presence of two witnesses.

GEO. DAVID CULLUM CODDINGTON.

Witnesses:
H. T. DELL,
B. HARWITZ.